United States Patent [19]
Kratel et al.

[11] Patent Number: 5,532,458
[45] Date of Patent: Jul. 2, 1996

[54] RADIANT HEATER, IN PARTICULAR, FOR HEATING A GLASS-CERAMIC HOT PLATE

[75] Inventors: Günter Kratel, Durach; Thomas Eyhorn, Altusried; Günter Stohr, Durach; Andreas Rell, Waltenhofen, all of Germany

[73] Assignee: Wacker-Chemie GmbH, Munich, Germany

[21] Appl. No.: 308,740

[22] Filed: Sep. 16, 1994

[30] Foreign Application Priority Data

Sep. 17, 1993 [DE] Germany ............... 43 31 702.2

[51] Int. Cl.⁶ ................................................. H05B 3/68
[52] U.S. Cl. ............................... 219/464; 219/467
[58] Field of Search ............................ 219/464–468, 219/463, 457–458

[56] References Cited

U.S. PATENT DOCUMENTS

| | | | |
|---|---|---|---|
| 3,833,793 | 9/1974 | McWilliams et al. | 219/464 |
| 4,388,520 | 6/1983 | McWilliams et al. | 219/464 |
| 4,713,527 | 12/1987 | Kicherer et al. | 219/464 |
| 4,985,163 | 1/1991 | Kratel et al. | |

FOREIGN PATENT DOCUMENTS

| | | |
|---|---|---|
| 0095118 | 11/1983 | European Pat. Off. . |
| 0204185 | 12/1985 | European Pat. Off. . |
| 0189108 | 7/1986 | European Pat. Off. . |
| 0211682 | 2/1987 | European Pat. Off. . |
| 3020326 | 12/1985 | Germany . |
| 2858342 | 11/1987 | Germany . |
| 9106193 | 5/1991 | WIPO . |

*Primary Examiner*—Teresa J. Walberg
*Assistant Examiner*—Sam Paik
*Attorney, Agent, or Firm*—Collard & Roe

[57] ABSTRACT

A radiant heater, in particular for heating a glass-ceramic hot plate, has an area bearing an electrical heating element, with this area being the surface of an insulator which comprises a mounting layer and/or a thermally insulating microporous insulation layer, and having a dish-shaped enclosure which forms an annulus surrounding the insulator. The radiant heater has the mounting layer and/or the enclosure and/or the microporous insulation layer comprising a highly porous, fiber-free inorganic material, for example vermiculite. A particularly preferred embodiment provides for a fiber-free radiant heater.

18 Claims, 1 Drawing Sheet

RADIANT HEATER, IN PARTICULAR, FOR HEATING A GLASS-CERAMIC HOT PLATE

BACKGROUND OF THE INVENTION

1. Field of the Invention

The present invention relates to a radiant heater, in particular for heating a glass-ceramic hot plate, having an area bearing an electrical heating element, with this area being the surface of an insulator which comprises a mounting layer and/or a thermally insulating microporous insulation layer, and having a dish-shaped enclosure which forms an annulus surrounding the insulator.

2. The Prior Art

German Patent 30 20 326 C2 discloses a radiant heater for a glass-ceramic hot plate in which between the electrical heating coil and the bottom of a metal receiving dish there is located a one-piece thermal insulation material which comprises, on the bottom side, a microporous insulation layer and, in the direction towards the heating coil, comprises a microporous hardened mounting layer. The heating coil is adhesively bonded on the upper side of the mounting layer. In addition, the mounting layer has an additionally densified circumferential border which projects beyond the plane of the heating coil and functions as support for the glass-ceramic hot plate. For reinforcement, the mounting layer opposite the insulation layer comprises, besides a hardener, also an increased proportion of silicate fibers.

German Patent 28 58 342 C2 describes a radiant heater for hot plates in which the electrical heating coil is stapled into an insulating plate which comprises ceramic reinforcing fibers. The staples are held in the insulating plate by friction. The plate is set in a protective pan of metal. Furthermore, there is provided a ring of reinforcing fibers which rests on the margin of the insulating plate and projects over the upper edge of the protective pan so that in the operating state the surface of the ring supports the glass-ceramic hot plate.

International Patent Application WO-91/06193 discloses a radiant heater unit having a ceramic heating-element support which covers preferably 10–20% of the area of thermal insulation arranged underneath. The thermal insulation comprises a microporous thermal insulation material having a fiber content of 0–50% by weight.

It is generally known, and recognizable from the cited patents, that the mechanically stressed components of a radiant heater, in particular the layer provided for mounting of the electrical heating element and the support of the hot plate, have to comprise a strong material which resists the mechanical stresses in assembly and installation of the radiant heater and during its operation. A disadvantage is that the thermally insulating action of the mechanically stressable materials used hitherto is either unsatisfactory because of their high density, or microporous insulation material which is reinforced with fibers has to be used. Since, besides the carcinogenic asbestos fibers, other mineral fibers have also at least become suspected of being able to cause cancer, there is increasing public pressure to replace fiber-containing materials by fiber-free analogs. On the side of industry too, there is increasingly a search for fiber-free substitutes, not least to avoid a possible liability for removal of fiber-containing material after use thereof.

A further disadvantage results from the fact that the electrical heating elements are occasionally also fixed by means of metallic staples which are driven into the thermally insulating insulation material and can possibly cause short circuits if a staple accidentally contacts the metallic wall of the dish-shaped enclosure which surrounds the thermally insulating insulation material. Similar problems with electrical safety can result if the metallic heating element is partially pressed into the insulation layer, so as to anchor it therein. In addition, for an enclosure constructed of metal, heat losses resulting from the insufficient thermal insulation of the metal have to be accepted.

SUMMARY OF THE INVENTION

It is an object of the present invention to provide a radiant heater which is fiber-free if required, which has particularly good thermal insulation, is simple and cheap to produce, and whose mechanically stressed parts have a high strength.

This object is achieved according to the present invention by means of a radiant heater, in particular for heating a glass-ceramic hot plate, having an area bearing an electrical heating element, with this area being the surface of an insulator which comprises a mounting layer and/or a thermally insulating microporous insulation layer, and having a dish-shaped enclosure which forms an annulus surrounding the insulator, wherein at least one of the mounting layer and/or the enclosure and/or the microporous insulation layer comprises a highly porous, fiber-free inorganic material.

In principle, both the dish-shaped enclosure, hitherto manufactured of metal, of the radiant heater, and also the mounting layer, sometimes used, comprising hardened, fiber-containing material or ceramic material and bearing the electrical heating element, can be replaced by an appropriately shaped body of the highly porous inorganic material. It is likewise possible for a part of the highly porous material to be mixed into the thermally insulating microporous insulation layer during its production, by which means the mechanical load-bearing capacity of the insulation layer is increased. If use is made of an insulation layer reinforced in this way, it is advantageous to also mount the electrical heating element on its surface and to omit a mounting layer. In principle, it is also possible to replace the fiber ring described in German Patent 28 58 342 C2 for supporting the hot plate by an appropriate ring of the highly porous inorganic material.

Since the use of the highly porous inorganic material is not strictly necessary for either the dish-shaped enclosure or the mounting layer or the thermally insulating insulation layer and additionally there is the option of providing the radiant heater with, besides a thermally insulating insulation layer, a mounting layer or, if desired, of omitting this, there results a series of possible combinations of which the following are preferred:

a) a radiant heater having a thermally insulating, microporous, preferably fiber-free insulation layer and a mounting layer of the highly porous inorganic material. Particularly preferably, the dish-shaped enclosure likewise comprises the highly porous inorganic material, although in this case an enclosure of metal should also be acceptable; and b) a radiant heater having a thermally insulating, microporous, preferably fiber-free insulation layer which is reinforced by mixing in the highly porous inorganic material during its production and on whose surface the electrical heating element is mounted. In this case, the dish-shaped enclosure preferably comprises the highly porous inorganic material.

BRIEF DESCRIPTION OF THE DRAWINGS

Other objects and features of the present invention will become apparent from the following detailed description considered in connection with the accompanying drawings which disclose the embodiments of the present invention. It should be understood, however, that the drawings are designed for the purpose of illustration only and not as a definition of the limits of the invention.

In the drawings, wherein similar reference characters denote similar elements throughout the several views.

DETAILED DESCRIPTION OF PREFERRED EMBODIMENTS

Figure 1:
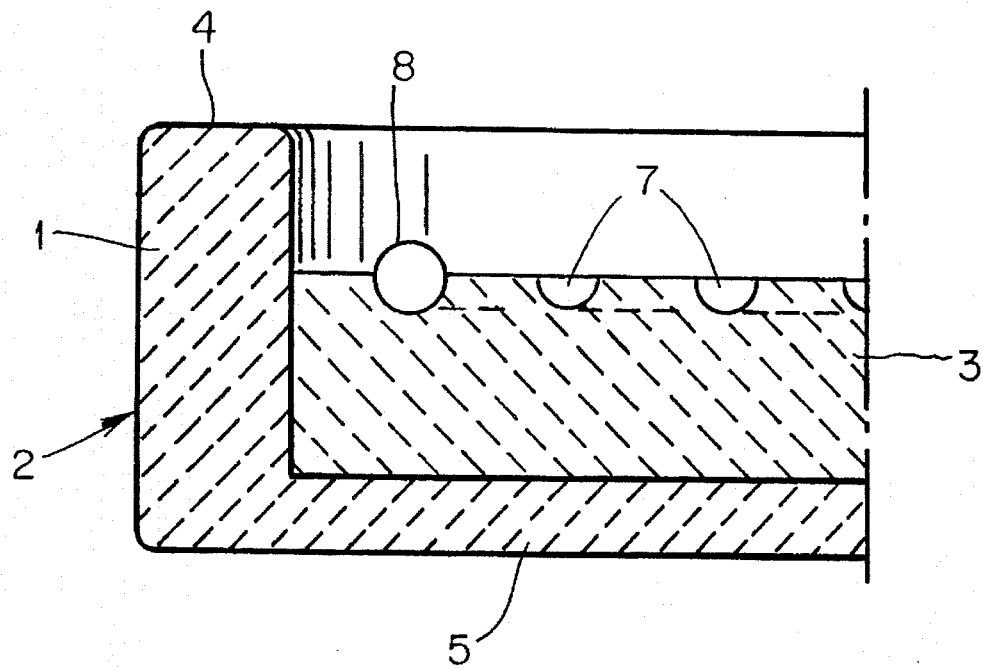
FIG. 1 is half of a cross section having mirror symmetry through the dish-shaped enclosure of a radiant heater of the invention, with the enclosure comprising highly porous inorganic material and the insulator which surrounds the enclosure being formed only of the microporous insulation layers.
Figure 2:
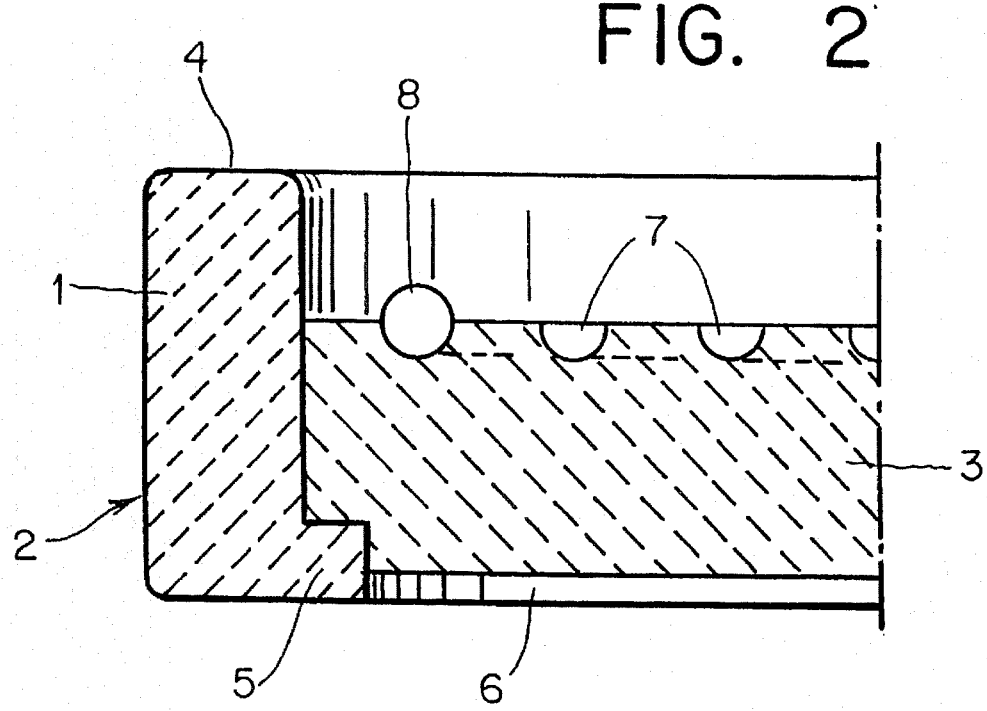
FIG. 2 shows a half cross section of a second embodiment of the dish-shaped enclosure of a radiant heater of the invention.

Turning now in detail to the drawings, FIG. 1 shows a dish-shaped enclosure of the highly porous inorganic material. It is advantageous to select the shape of the enclosure in such a way that the side wall 1 of the enclosure 2, which in the operating state surrounds the insulator 3, projects above the highest point of the heating element, preferably by from 1 to 20 mm. In the operating state, a glass-ceramic hot plate can then rest on the surface 4 of the side wall. In principle, such a dish-shaped enclosure can also be constructed of two or more shaped parts which can be put together. A further embodiment of the dish-shaped enclosure relates to the bottom 5 thereof. This can, but does not have to, be in the form of a full sheet. The embodiment shown in FIG. 2 provides for leaving a circular opening 6 in the bottom 5 of the dish-shaped enclosure so that in plan view the bottom is an annulus. If the bottom is configured in this way, it is advantageous for the insulator to be shaped so that it fills the opening in the bottom with positive contact.

The inorganic material used according to the invention is highly porous and has a high proportion of silicon dioxide. Particularly suitable are representatives of the groups including the expanded sheet silicates (e.g. vermiculite, mica), the highly porous volcanic rocks (e.g. perlite, pumice), the silicified fossil earths (e.g. diatomaceous earth, kieselguhr) and the plant ashes (e.g. rice ash, maize ash). Representatives of these groups which are preferably used are perlite and kieselguhr. Particular preference is given to using expanded vermiculite. The highly porous inorganic material can comprise representatives of these groups in any mixing ratios. In the case of vermiculite, however, preference is given to using this material without further admixture of a representative from the specified groups. To produce shaped bodies such as the dish-shaped enclosure or the mounting layer, a setting binder is mixed into the highly porous inorganic material. These mixtures have the following compositions:

60–99.9% by weight, particularly preferably 70–90% by weight, of highly porous inorganic material; and 0.1–40% by weight, particularly preferably 10–30% by weight, of setting binder.

The thermally insulating microporous insulation layer has, in the preferred fiber-free form, the following composition:

30–100% by weight, particularly preferably 50–89% by weight, of finely divided metal oxide;

0–50% by weight, particularly preferably 20–40% by weight, of opacifier; and

0–15% by weight, particularly preferably 0.5–2% by weight, of inorganic binder.

The microporous insulation layer can, however, also be in fiber-containing form, especially if the fibers used are acceptable from a health point of view or cannot go into the lungs. The preferred composition of the fiber-containing microporous insulation layer is:

30–100% by weight, particularly preferably 50–89% by weight, of finely divided metal oxide;

0–50% by weight, particularly preferably 20–49% by weight, of opacifier;

0.1–50% by weight, particularly preferably 5–20% by weight, of fiber material; and 0–15% by weight, particularly preferably 0.5–2% by weight, of inorganic binder.

If a mounting layer is omitted and the electrical heating element is mounted on the thermally insulating insulation layer of a fiber-free mixture of highly porous inorganic and microporous material, the mixture from which the insulation layer is produced has the following composition:

20–90% by weight, particularly preferably 25–50% by weight, of finely divided metal oxide;

10–80% by weight, particularly preferably 50–75% by weight, of highly porous inorganic material;

0–50% by weight, particularly preferably 20–40% by weight, of opacifier;

0–30% by weight, particularly preferably 3–20% by weight, of setting binder; and 0–15% by weight, particularly preferably 0.5–2% by weight, of inorganic binder.

The finely divided metal oxides used have specific surface areas measured by BET of preferably 50–700 m$^2$/g, in particular 70–400 m$^2$/g. Preference is given to using pyrogenic silicas, including electric arc silicas, low-alkali precipitated silicas, silicon dioxide aerogels and aluminum oxides and also mixtures of the specified materials. Particular preference is given to pyrogenic silica or aluminum oxide or mixtures thereof.

It is advantageous for the opacifier used to have an absorption maximum in the infrared region between 1.5 and 10 μm. Examples of suitable opacifiers are ilmenite, titanium dioxide, silicon carbide, iron(II)/iron(III) mixed oxides, chromium dioxide, zirconium oxide, manganese dioxide, iron oxide, silicon dioxide, aluminum oxide and zirconium silicate, and also mixtures thereof.

Particular preference is given to using ilmenite and zirconium silicate.

The inorganic binders which are added to the microporous insulation material are known. They include, for example, the binders specified in U.S. Pat. No. 4,985,163. Inorganic binders which are preferably used include borides of aluminum, of titanium, of calcium, silicides such as calcium silicide or calcium aluminum silicide, boron carbide, oxides such as magnesium oxide, calcium oxide, barium oxide or mixtures of the specified material.

The setting binders which are mixed with the highly porous inorganic material include aqueous solutions of phosphates such as monoaluminum phosphate, silicophosphates and also alkali metal water glasses and silica sol. Mixtures of the specified materials can also be used as setting binder. Preference is given to sodium water glass, monoaluminum phosphate, silicophosphates and mixtures thereof.

If fiber material is provided in the thermally insulating insulation layer, use can be made of glass wool, quartz glass fibers, rock wool, basalt wool, slag wool, ceramic fibers, fibers of aluminum oxide or silicon dioxide, or mixtures of the specified fibers. Preference is given to fibers of aluminum oxide and/or silicon dioxide obtained from a melt. The fiber diameter is advantageously 0.1–12 μm and the fiber length is 1–25 mm.

The production of the microporous insulation layer, even if it comprises a proportion of highly porous inorganic material, preferably includes the following process steps:

a) precompaction of the mixture comprising the finely divided metal oxide at pressures of 1–5 bar;

b) pressing of the precompacted material into the desired shape at final pressures of 8–20 bar; and c) if desired, heating the microporous insulation layer to temperatures of 100°–900° C.

To produce a dish-shaped enclosure or a mounting layer from a mixture comprising the highly porous inorganic material, this mixture is pressed into the desired shape and compacted to a density of 200–700 kg/m$^3$ preferably 250–500 kg/m$^3$. For curing, a subsequent thermal treatment in air in the range of 20°–250° C. is sufficient.

In one embodiment which is preferred particularly when the dish-shaped enclosure comprises the highly porous inorganic material and the bottom thereof has a circular opening, the thermally insulating insulation layer of microporous material is laid or adhesively bonded into the finished dish-shaped enclosure. The specified setting binders can be used as adhesives. If a mounting layer of the highly porous material is further provided, this is laid or adhesively bonded as a sheet on to the surface of the microporous insulation layer. The microporous insulation layer forms, in the first case alone, in the second case together with the mounting layer, the insulator which is surrounded by the dish-shaped enclosure. The surface of the insulator opposite the bottom of the enclosure bears the electrical heating element of the radiant heater.

Another method of proceeding provides for the mixture for the microporous insulation layer to be introduced into the previously finished dish-shaped enclosure having a closed bottom, with the enclosure being able to comprise metal or the highly porous inorganic material, and for the microporous insulation layer to be pressed into the desired shape in the enclosure, utilizing the shaping property of the enclosure. In addition, the microporous insulation layer can first be only pre-pressed in the enclosure or, in the pre-pressed state, be laid or adhesively bonded into the enclosure, and subsequently a finished or likewise only pre-pressed mounting layer of the highly porous inorganic material can be laid or adhesively bonded on to the microporous insulation layer. Finally, the insulation layer and mounting layer are then together pressed in the enclosure to form an insulator and are, if desired, further subjected to a thermal treatment. In this case, the mounting layer is advantageously provided with a perforation so that water vapor formed on heating can escape unhindered.

In a further embodiment, the mixture for the microporous insulation body is first introduced into the dish-shaped enclosure as a loose layer. This loose layer is then covered with the mixture for the mounting layer of highly porous inorganic material and finally both mixtures are pressed together.

The electrical heating element is mounted on the surface of the insulator opposite the bottom of the enclosure, depending on the choice of embodiment of the radiant heater, on the surface of the microporous insulation layer opposite the bottom or the surface of the highly porous mounting layer opposite the bottom. The surface of the insulator does not have to be completely flat. It may be advantageous to provide depressions, for example in the form of annular grooves 7 (FIG. 2) pressed in during production, in which the heating elements are supported. The heating elements 8 are affixed by adhesive bonding on to the surface of the insulator, for example using an inorganic adhesive based on phosphate or silicate and/or by pressing staples going around the heating element into the surface of the insulator, with the staples also being able to penetrate the microporous insulation layer, and/or by directly pressing parts of the heating element into the surface of the insulator. If desired, the heating element can be anchored in the mounting layer while this is, as described above, pressed together with the microporous insulation layer into the dish-shaped enclosure.

In this description the term electrical heating element is used to include heating spirals, heating wires, heating tapes and also halogen lamps and combinations of such heating elements.

The radiant heaters of the invention are preferably used for heating glass-ceramic hot plates. However, it is likewise possible to use them for heating ovens, in particular baking ovens, grills and in heating or halogen radiant heaters.

If the dish-shaped enclosure is manufactured of the highly porous inorganic material, an otherwise customary fiber ring resiliently supporting the hot plate can be omitted. The enclosure is electrically insulating, does not possess the heat-conducting properties of metal and can be produced more cheaply than the metallic enclosures hitherto used. The enclosures of metal can be replaced by the enclosures of highly porous material in existing production lines without special expense.

If the insulator is manufactured of the highly porous inorganic material, a completely fiber-free radiant heater can be provided. The mechanical connection between the insulator and the electrical heating element borne by it remains stable even during the operation of the radiative heater, since the highly porous inorganic material can elastically absorb the forces acting on the insulator principally as a result of thermal expansion of the heating element.

The present invention will now be further illustrated by reference to the following examples which are not to be deemed limitative of the invention in any manner thereof.

EXAMPLE 1

A homogeneous mixture of 80% by weight of expanded vermiculite having a particle diameter of 0.2–8 mm and 20% by weight of sodium water glass was pressed under uniaxial pressure to form a shaped body having the shape of a dish-shaped enclosure and cured at room temperature. The bottom of the dish-shaped enclosure was closed over its entire area. The density of the finished enclosure was 430 kg/m$^3$.

A mixture of 65.0% by weight of pyrogenic silica and 34.2% by weight of zirconium silicate was then pressed into the finished enclosure under a pressure of 8–20 bar. Subsequently, a mounting layer prefabricated in accordance with U.S. Pat. No. 4,985,163 and having the composition 62.5% by weight of pyrogenic silica, 31.7% by weight of zirconium silicate, 5% by weight of aluminum silicate fibers and 0.8% by weight of boron carbide was adhesively bonded on to the free surface of the microporous insulation layer by means of a silicophosphate adhesive.

EXAMPLE 2

A homogeneous mixture comprising 50% by weight of perlite having a particle diameter of 0.1–5 mm, 35% by weight of rice ash and 15% by weight of monoaluminumphosphate (40% strength aqueous solution) was pressed under uniaxial pressure to form a dish-shaped enclosure, with the bottom of the enclosure having a circular opening. Into this enclosure was laid a prefabricated microporous insulation layer having a composition prepared in accordance with Example 1.

EXAMPLE 3

A mixture of 65% by weight of pyrogenic silica and 35% by weight of zirconium silicate is pressed under a specific pressure of 8–20 bar into a dish-shaped enclosure of sheet metal having a bottom closed over its entire area. The diameter of the enclosure was 219 mm. On to the microporous insulation formed was pressed a 4 mm thick pre-pressed component comprising 85% by weight of expanded vermiculite and 15% by weight of monoaluminumphosphate (40% strength aqueous solution) which had previously been cured at 250° C., as mounting layer, in such a way that the friction with the wall of the enclosure was sufficient to mechanically hold the mounting layer. The foot-like recesses of an electrical heating element having the shape of a flat tape were subsequently pressed into the mounting layer by means of an indentation device.

While several embodiments of the present invention have been shown and described, it is to be understood that many changes and modifications may be made thereunto without departing from the spirit and scope of the invention as defined in the appended claims.

What is claimed is:

1. A radiant heater, comprising an insulator having a surface for mounting an electrical heating element onto said surface;

said insulator comprising a thermally insulating microporous insulation layer;

a dish-shaped enclosure which forms an annulus surrounding of the insulator, said enclosure having a bottom; and a circular opening in said bottom, wherein the insulator is shaped so that it fills the opening in the bottom and wherein at least one member selected from the group consisting of the enclosure and the microporous insulation layer comprises a highly porous, fibre-free inorganic material.

2. The radiant heater as claimed in claim 1, wherein the inorganic material is selected from the group consisting of the expanded sheet silicates, highly porous volcanic rocks, silicified fossil earths, plant ashes, and the mixtures thereof.

3. The radiant heater as claimed in claim 1, wherein the inorganic material is vermiculite.

4. The radiant heater as claimed in claim 1, wherein the microporous insulation layer is fibre-free.

5. The radiant heater as claimed in claim 1, wherein the electrical heating element is adhesively bonded onto the surface of the insulator.

6. The radiant heater as claimed in claim 1, wherein the electrical heating element is stapled onto the surface of the insulator.

7. The radiant heater as claimed in claim 1, wherein the electrical heating element is partially pressed onto the surface of the insulator.

8. A radiant heater, comprising an insulator having a surface for mounting an electrical heating element onto said surface;

said insulator comprising a mounting layer and a thermally insulating microporous insulation layer;

a dish-shaped enclosure which forms an annulus surrounding of the insulator, said enclosure having a bottom; and a circular opening in said bottom, wherein the insulator is shaped so that it fills the opening in the bottom and wherein at least one member selected from the group consisting of the mounting layer, the enclosure and the microporous insulation layer comprises a highly porous, fibre-free inorganic material.

9. The radiant heater as claimed in claim 8, wherein the inorganic material is selected from the group consisting of the expanded sheet silicates, highly porous volcanic rocks, silicified fossil earths, plant ashes, and the mixtures thereof.

10. The radiant heater as claimed in claim 8, wherein the inorganic material is vermiculite.

11. The radiant heater as claimed in claim 8, wherein the microporous insulation layer is fibre-free.

12. The radiant heater as claimed in claim 8, wherein the electrical heating element is adhesively bonded onto the surface of the insulator.

13. The radiant heater as claimed in claim 8, wherein the electrical heating element is stapled onto the surface of the insulator.

14. The radiant heater as claimed in claim 8, wherein the electrical heating element is partially pressed onto the surface of the insulator.

15. In a method for radiative heating of a glass-ceramic hot plate, the improvement comprising providing a radiant heater, comprising an insulator having a surface for mounting an electrical heating element onto said surface;

said insulator comprising a thermally insulating microporous insulation layer;

a dish-shaped enclosure which forms an annulus surrounding of the insulator, said enclosure having a bottom; and a circular opening in said bottom, wherein the insulator is shaped so that it fills the opening in the bottom and wherein at least one member selected from the group consisting of the enclosure and the microporous insulation layer comprises a highly porous, fibre-free inorganic material; and using said radiant heater for heating said glass-ceramic hot plate.

16. In a method for radiative heating of a baking oven, the improvement comprising providing a radiant heater, comprising an insulator having a surface for mounting an electrical heating element onto said surface;

said insulator comprising a thermally insulating microporous insulation layer;

a dish-shaped enclosure which forms an annulus surrounding of the insulator, said enclosure having a bottom; and a circular opening in said bottom, wherein the insulator is shaped so that it fills the opening in the bottom and wherein at least one member selected from the group consisting of the enclosure and the microporous insulation layer comprises a highly porous, fibre-free inorganic material; and using said radiant heater for heating said baking oven.

17. In a method for radiative heating of a grill, the improvement comprising providing a radiant heater, comprising an insulator having a surface for mounting an electrical heating element onto said surface;

said insulator comprising a thermally insulating microporous insulation layer;

a dish-shaped enclosure which forms an annulus surrounding of the insulator, said enclosure having a bottom; and a circular opening in said bottom, wherein the insulator is shaped so that it fills the opening in the bottom and wherein at least one member selected from the group consisting of the enclosure and the microporous insulation layer comprises a highly porous, fibre-free inorganic material; and using said radiant heater for heating said grill.

18. In a method for radiative heating of an object, the improvement comprising providing a radiant heater, comprising an insulator having a surface for mounting an electrical heating element onto said surface;

said insulator comprising a thermally insulating microporous insulation layer;

a dish-shaped enclosure which forms an annulus surrounding of the insulator, said enclosure having a bottom; and a circular opening in said bottom, wherein the insulator is shaped so that it fills the opening in the bottom and wherein at least one member selected from the group consisting of the enclosure and the microporous insulation layer comprises a highly porous, fibre-free inorganic material; and using said radiant heater for heating said object by a halogen radiant heater.

\* \* \* \* \*